United States Patent [19] [11] Patent Number: 4,619,350
Maezono et al. [45] Date of Patent: Oct. 28, 1986

[54] CLUTCH OPERATION CONTROL SYSTEM FOR FLUID TORQUE CONVERTER OF VEHICULAR TRANSMISSION

[75] Inventors: Masakazu Maezono; Keiichi Ishikawa, both of Saitama, Japan

[73] Assignee: Honda Giken Kogyo Kabushiki Kaisha, Tokyo, Japan

[21] Appl. No.: 616,282

[22] Filed: Jun. 1, 1984

[30] Foreign Application Priority Data

Jun. 1, 1983 [JP] Japan .................................. 58-95774

[51] Int. Cl.⁴ ............................................. F16D 47/06
[52] U.S. Cl. ................................. 192/3.31; 192/103 R
[58] Field of Search ................. 192/75, 76, 3.28, 3.29, 192/3.31, 3.32, 3.33, 3.57, 3.58, 103 R; 137/625.69, 625.3; 251/121

[56] References Cited

U.S. PATENT DOCUMENTS 3,252,352 5/1966 General et al. ........................ 74/645
3,998,244 12/1976 Bentley ................................ 251/121
4,313,467 2/1982 Lang .................................. 137/625.3
4,398,555 8/1983 Taylor ................................. 251/121
4,431,094 2/1984 Parthuisot et al. ................. 192/3.31
4,506,773 3/1985 Schott ................................... 192/52

Primary Examiner—George H. Krizmanich
Attorney, Agent, or Firm—Lyon & Lyon

[57] ABSTRACT

A clutch operation control system for a fluid torque converter of a vehicular transmission in which the fluid torque converter is equipped with a clutch for mechanically connecting the input side and output side of said torque converter. The clutch has its clutch plate supplied at its one side with oil pressure in a control chamber to release the clutch and at its other side with the torque converter oil pressure in said fluid torque converter for operating the clutch by the differential pressure across the clutch plate. An oil line leading to the control chamber is connected at a vehicular speed equal to or higher than a predetermined level to an oil drain port by means of a control valve to operate the clutch with an engaging force of the torque converter pressure. The clutch plate has an orifice for providing communication between the two sides of said clutch plate. The control valve is formed with a throttle portion for throttling the communication passage between the oil line to the control chamber and said drain port in a relatively low vehicular speed range equal to or higher than said predetermined level for allowing some slippage of the clutch.

8 Claims, 5 Drawing Figures

CLUTCH OPERATION CONTROL SYSTEM FOR FLUID TORQUE CONVERTER OF VEHICULAR TRANSMISSION

The present invention relates to a clutch operation control system for a fluid torque converter of a vehicular transmission and, more particularly, to a control system for controlling the operation of a clutch which is disposed in the fluid torque converter of the vehicular transmission for mechanically coupling the input and output sides of the torque converter.

A system of that general type is known in the prior art from U.S. Pat. No. 3,252,352, for example, in which a clutch attached to a fluid torque converter has its clutch plate supplied at its one side with an oil pressure of a control chamber facing the same and at its other side with a torque converter pressure in the fluid torque converter and in which an oil line leading to the control chamber is connected at a vehicular speed equal to or higher than a predetermined level to an oil drain port by means of a control valve responding to a vehicular speed so that the clutch may be operated with an engaging force according to the torque converter pressure by the drainage from the control chamber thereby to connect the input and output sides of the fluid torque converter in a mechanically directly coupled state through said clutch, whereby an efficient torque transmission can be effected while preventing any slippage in the fluid torque converter due to the fluid torque transmission. However, if the predetermined vehicular speed in the known system is set at a relatively low level, the fluctuations in the torque from the engine are transmitted through said clutch to the output side and causes vibrations in the vehicular body and uncomfortable fluctuations in vehicle speed. Therefore, the predetermined vehicular speed for positive coupling has to be set at such a relatively high level as to minimize the fluctuations in the engine torque, thus being followed by a disadvantage that the operating range of the clutch is narrowed.

In the U.S. patent application Ser. No. 495,267, filed May 17, 1983 by the assignee of this application, an improved clutch operation control system was proposed in which there was added to the forementioned prior art system a switching device to switch the operating state of the clutch between a directly coupled state for mechanically directly coupling the input and output sides of the fluid torque converter and a slipping state for allowing slippage of the two sides in response to the vehicular speed to select said directly coupled state in a relatively high vehicular speed range and said slipping state in a relatively low vehicular speed range, whereby the fluctuations in the engine torque in a low speed range can be absorbed by the slippage of the clutch. In that proposal, said switching device is generally constructed such that said directly coupled state and said slipping state are selected by raising or dropping the torque converter pressure in accordance with the vehicular speed thereby to change the clutch engaging force. The engine torque was transmitted in the clutch slipping state to the output side such that it was divided into the torque transmission by the drag of the clutch and the fluid torque transmission. Therefore, the torque converter pressure cannot be dropped to below a predetermined level while ensuring the fluid torque transmission, with the resultant disadvantage that the enlargement of the operating range of the clutch is limited of itself by the limit to the reduction of the torque converter pressure.

In order to eliminate the disadvantages thus far described, the present invention has as an object to provide a system having a simple construction, in which the oil pressure in a control chamber, to be drained during the operation of a clutch, is controlled so that the operating range of the clutch may be set within a wide range without being regulated by the limit to the reduction in the torque converter pressure. According to a feature of the present invention, there is provided a clutch operation control system for a fluid torque converter of a vehicular transmission, in which a fluid torque converter attached to a vehicular transmission is equipped with a clutch for mechanically connecting the input side and output side of said torque converter, in which said clutch has its clutch plate supplied at its one side with an oil pressure in a control chamber facing the same and its other side with a torque converter pressure in said fluid torque converter, and in which an oil line leading to said control chamber is connected at a vehicular speed equal to or higher than a predetermined level to an oil drain port by means of a control valve responding to a vehicular speed so that said clutch may be operated with an engaging force according to said torque converter pressure by the drainage from said control chamber, said clutch operation control system being characterized by said clutch plate being formed with an orifice hole for providing communication between the two sides of clutch plate and said control valve being formed with a throttle portion for throttling the commununication passage between said oil line and said drain port in a relatively low vehicular speed range equal to or higher than said predetermined level.

The present invention will be described in the following in connection with the preferred embodiment thereof with reference to the accompanying drawings.

FIGS. 3a, 3b and 3c are cutaway side elevations of three different positions of the control valve of the system.

Figure 1:
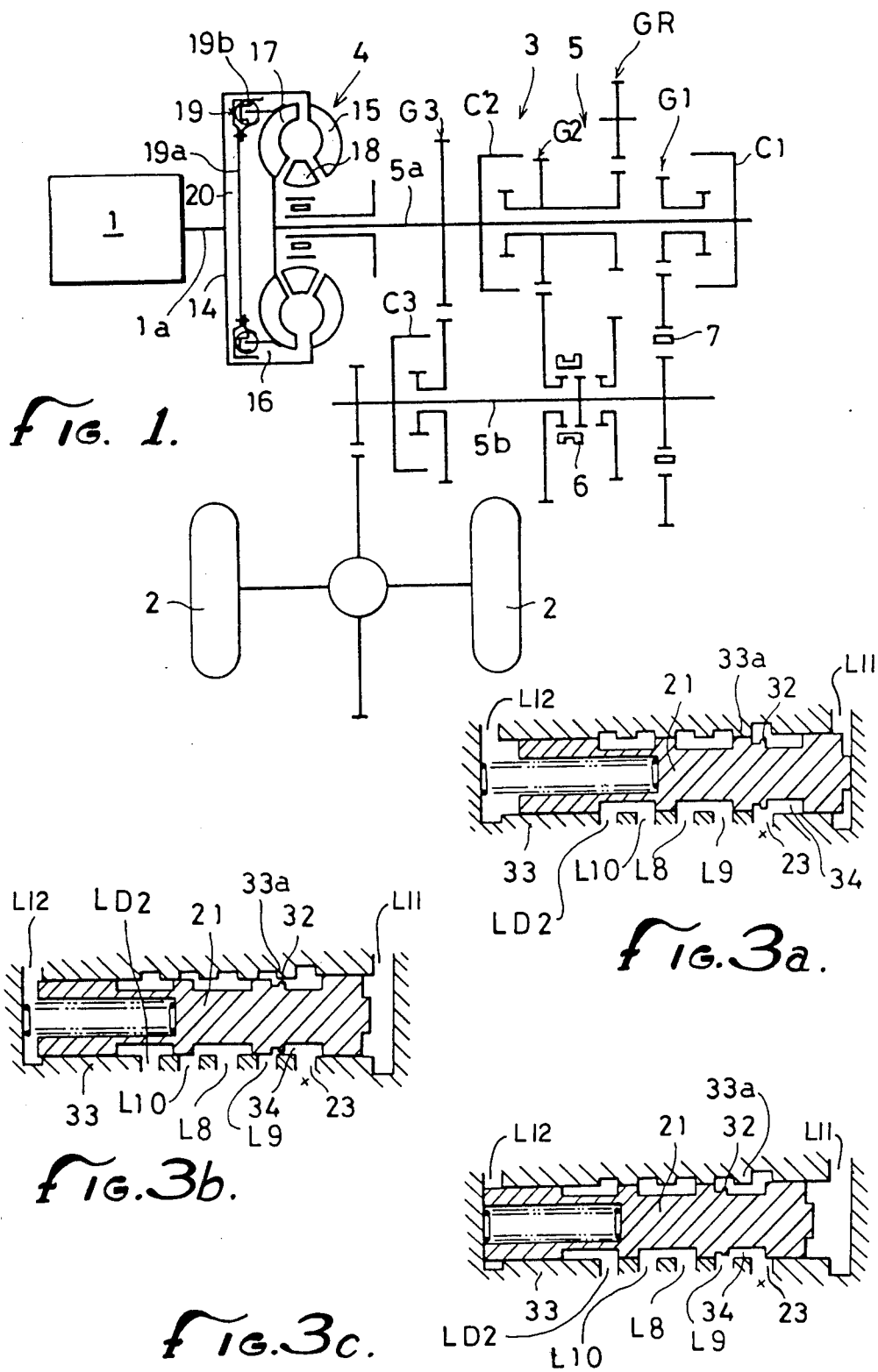
FIG. 1 is a diagram of a vehicle showing one example of the vehicular transmission to which the system of the present invention is applied.

Reference numerals 1 and 2 appearing in FIG. 1 indicate an engine and drive wheels of a vehicle, respectively. Indicated at numeral 3 is a vehicular transmission for coupling said engine 1 and said drive wheels 2. The transmission 3 is constructed of a fluid torque converter 4 and an auxiliary transmission 5 for effecting speed changes of three forward speeds and one reverse.

Said auxiliary transmission 5 is equipped with 1st to 3rd forward speed gear trains G1, G2, and G3 and a reverse gear train GR between a drive shaft 5a leading to said fluid torque converter 4 and a driven shaft 5b leading to the drive wheels 2. 1st to 3rd speed hydraulic clutches C1, C2 and C3 are interposed between the respective forward gear trains G1, G2 and G3 so that these gear trains G1, G2 and G3 may be selectively established by applying the respective hydraulic clutches C1, C2 and C3. On the other hand, the reverse gear train GR shares the 2nd speed hydraulic clutch C2 with 2nd speed gear train G2 so that it may be established by the rightward reverse switching operation of a selector gear 6 for selecting the two gear trains G2 and GR, as shown. Indicated at reference numeral 7 in the drawing is a one-way clutch which is introduced into the 1 st speed gear train G1 for allowing the over run of the output shaft 5b.

Figure 2:
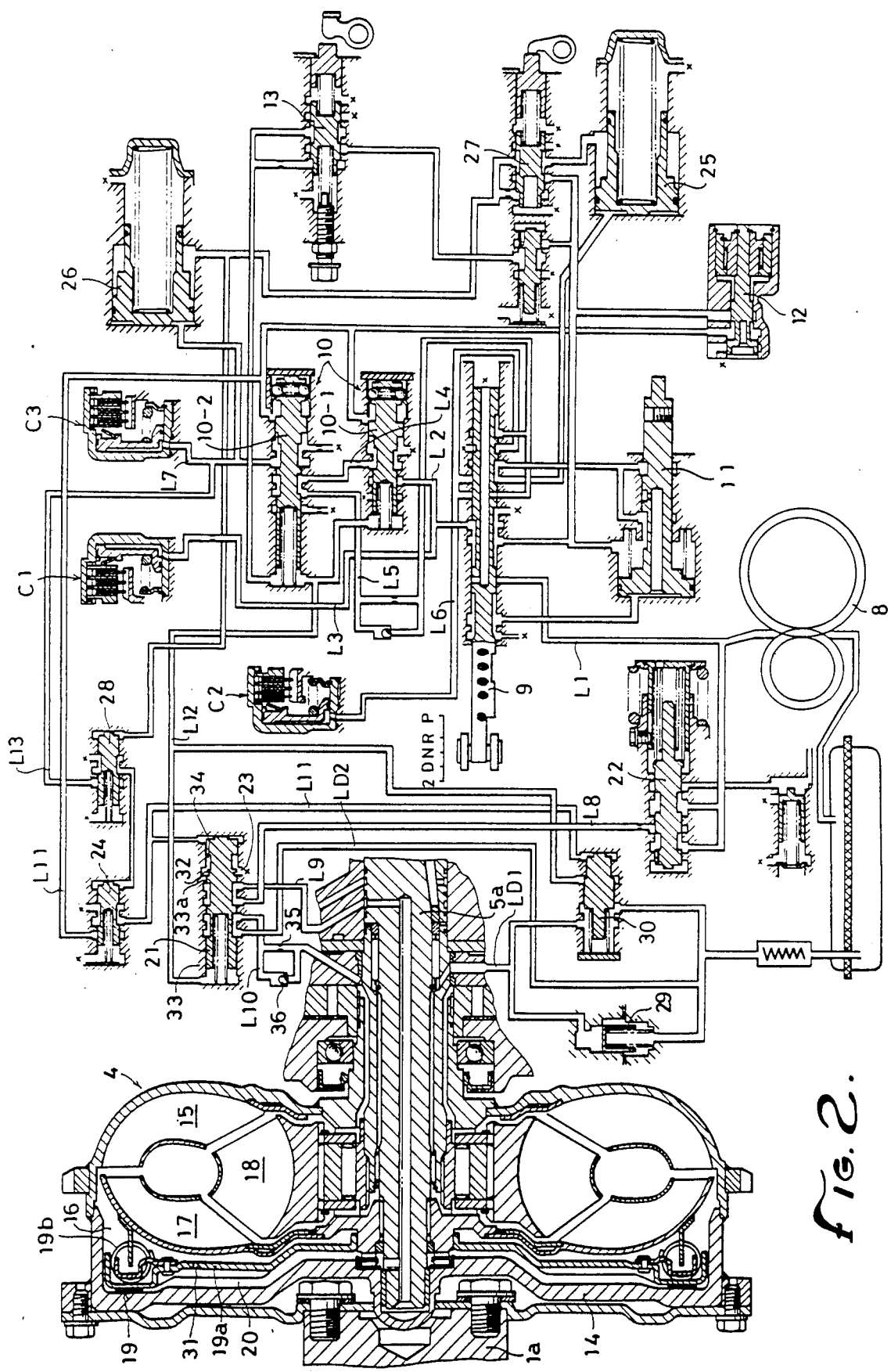
FIG. 2 is an oil circuit diagram showing one example of the system of the present invention.

The aforementioned respective hydraulic clutches C1, C2 and C3 are controlled in their oil supplies and drains by means of a hydraulic circuit shown in FIG. 2, for example. More specifically, this hydraulic circuit is equipped with: an oil pressure source 8; a manual valve 9 which can be shifted into five positions, i.e., a parking position "P", a reverse position "R", a neutral position "N", an automatic drive position "D", and a 2nd speed holding position "2"; and a servo valve 11 for connecting the aforementioned selector gear 6 to switching the forward and reverse runs. In the "D" position of the manual valve 9, a first oil line L1 leading from the oil pressure source 8 for oil supply is connected to a second oil line L2 leading to the shift valve 10 so that the oil is fed to the 1st speed hydraulic clutch C1 through a third oil line L3 branched from the second oil line L2 and to the respective 2nd and 3rd speed hydraulic clutches C2 and C3 through the shift valve 10. Here, this shift valve 10 is constructed of a first valve 10-1 at an upstream side for shifting the 1st–2nd speeds and a second valve 10-2 at a downstream side for shifting the 2nd–3rd speeds, and these first and second valves 10-1 and 10-2 are connected with each other through an intermediate fourth oil line L4. A governor pressure coming from a governor valve 12 and responding to a vehicular speed is applied to the one-side ends, i.e., the right-hand ends of those valves 10-1 and 10-2, and a throttle pressure coming from a first throttle valve 13 and responding to a throttle opening is applied to the lefthand ends of the valves 10-1 and 10-2. In accordance with increase in the vehicular speed, the first valve 10-1 is moved from its righthand 1st speed position to its lefthand 2nd speed position to connect the second oil line L2 through the fourth oil line L4 with a fifth oil line L5 at the output side of the second valve 10-2 so that the oil is supplied to the 2nd speed hydraulic clutch C2 through a sixth oil line L6 which is connected with the fifth oil line L5 in the "D" position of the manual valve 9. If the vehicular speed further increases, the second shift valve 10-2 is moved from the righthand 2nd speed position to the lefthand 3rd speed position to switch the connection of the fourth oil line L4 from the fifth oil line L5 to a seventh oil line L7 leading to the 3rd speed hydraulic clutch C3 so that the oil is supplied to the 3rd speed hydraulic clutch C3.

The aforementioned fluid torque converter 4 is equipped, in an internal cavity 16 which is defined by, on one-side, input case 14 connected to the crankshaft 1a of the engine 1 and on the other side, pump 15 connected to the input case 14, with both a turbine 17 connected to the drive shaft 5a of the auxiliary transmission 5 and a stator 18 interposed between the pump 15 and the turbine 17, and is further equipped with an applicable clutch 19 for mechanically coupling the input side of the torque converter 4, e.g., the input case 14 and the output side of the same, e.g., the turbine 17. The fluid torque converter 4 as described above is so constructed as to effect the fluid torque transmission by the circulation of the internal fluid among the pump 15, the turbine 17 and the stator 18 when the clutch 19 is disconnected and the mechanical torque transmission through said clutch 19 when this clutch 19 is connected.

For the clutch 19 a variety of different types of clutches may be used such as a multi-disc friction clutch or a one-way clutch. In the shown embodiment, a single-disc friction clutch is used and has its clutch plate 19a arranged in a gap between the input case 14 and the turbine 17 such that it is movable in the axial direction. The clutch plate 19a is connected to said turbine 17 through a damper springs 19b. Moreover, the aforementioned clutch plate 19a has its one side supplied with the oil pressure in a control chamber 20 between itself and said input case 14 and its other side supplied with the oil pressure in the internal cavity 16, i.e., the torque converter pressure. As a result, the clutch plate 19a is switched between a connected state, in which it is frictionally engaged with the input case 14 by said torque converter pressure, when the oil is drained from said control chamber 20 and a disconnected state in which it is disconnected from the input case 14 when the oil is supplied to the control chamber 20. The supply and discharge of the oil to and from the control chamber 20 is switched and controlled in the following manner by a control valve 21 which responds to the vehicular speed.

More specifically, the control valve 21 can be switched between the righthand clutch-released position (i.e., the position shown in both FIG. 2 and FIG. 3a), in which an eighth oil line L8 for introducing the pressure oil from the oil pressure source 8 through a regulator valve 22 is connected with a ninth oil line L9 leading to the control chamber 20 to effect the oil supply to said chamber 20, and the lefthand clutch-applied position in which the eighth oil line L8 is connected to a tenth oil line L10 leading to the internal cavity 16 to effect the oil supply to the cavity 16 and in which the ninth oil line L9 is connected to an oil drain port 23 to effect the oil drainage from the control chamber 20 (as shown in FIG. 3c). In response to a vehicular speed signal according to the vehicular speed, e.g., the governor pressure acting from the governor valve 12 through an eleventh oil line L11, said control valve 21 is forced to the clutch-applied position so that the control valve 21 is switched to the clutch-applied position at a vehicular speed equal to or higher than a predetermined level to apply the clutch 19.

In the clutch-released position, incidentally, the oil is supplied to the internal cavity 16 through the control chamber 20 to effect the fluid torque transmission between the pump 15 and the turbine 17.

In the shown embodiment, moreover, the throttle pressure from the first throttle valve 13 is applied through a twelfth oil line L12 to said control valve 21 against the governor pressure so that the switching operation to the clutch-applied position may be effected at a high speed in accordance with the rise in the throttle opening. In the eleventh oil line L11 for introducing the governor pressure into said control valve 21, there is disposed a switching valve 24 which is adapted to be opened by the oil pressure coming from the 3rd speed hydraulic clutch C3 through a thirteenth oil line L13, whereby the governor pressure is applied to said control valve 21 to actuate the clutch 19 only when the 3rd speed gear train G3 is established. At the same time, in said thirteenth oil line L13, there is disposed a shut-off valve 28 which is adapted to be closed, when the throttle opening is lower than a predetermined value, by the throttle pressure coming from a second throttle valve 27 for regulating in accordance with the throttle opening the back pressures of accumulators 25 and 26 for damping the pressures of the 2nd and 3rd speed hydraulic clutches C2 and C3, whereby the operation of the clutch 19 during deceleration is prevented.

In a first oil drain line LD1 leading to the internal cavity 16, there are disposed both a check valve 29 for setting an upper limit of the torque converter pressure and a pressure adjusting valve 30 which is arranged in parallel with the check valve 29 to constitute the aforementioned switching device of the foregoing proposal. The pressure adjusting valve 30 is forced by the governor pressure form the eleventh oil line L11 and the throttle pressure from the twelfth oil line L12 toward a closed side to raise or drop the torque converter pressure in accordance with the vehicular speed and the throttle opening. And, the operating state of the clutch 19 is switched between the directly coupled state and the slipping state in accordance with the change in the engaging force of the clutch 19 according to the rise or drop of the torque converter pressure. Here, said pressure adjusting valve 30 is so constructed that it can hold, in its fully open state, the torque converter pressure at the lower limit necessary for the fluid torque transmission.

Incidentally, when the clutch is released, the drainage from the internal cavity 16 is performed through a second oil drain line LD2 connected with the tenth oil line L10 through said control valve 21 so that the torque converter pressure is dropped to a level as low as possible in the vicinity of the lower limit necessary for the fluid torque transmission.

As should be noted here, according to the present invention, the clutch plate 19a is formed with an orifice hole 31 for providing communication between the two sides thereof, and the aforementioned control valve 21 is formed with a throttle portion 32 (as best seen in FIG. 3a, b and c) for throttling the communication passage between the ninth oil line L9 and the oil drain port 23 in a relatively low vehicular speed range equal to or higher than a predetermined level by connecting the ninth oil line L9 leading to the aforementioned control chamber 20 with the oil drain port 23 in response to the switching operation of said valve 21 to the clutch-applied position. These features of the present invention will be described in more detail with reference to FIGS. 3a, 3b and 3c of the drawings. Said ninth oil line L9 and said oil drain port 23 are made to communicate with each other in a valve casing 33 by way of a righthand end annular groove 34 which is formed in the spool member of said control valve 21. This annular groove is formed therein with an annular land for providing said throttle portion 32. When said control valve 21 is shifted over the predetermined vehicular speed from the clutch-released position shown in FIG. 3a to the left clutch-connected position, as shown in FIG. 3b, said throttle portion 32 is shifted to the poistion facing the wall 33a, which is formed in the valve casing 33 between the connecting port of line L9 and the oil drain port 23, to throttle the communication passage which is formed by said annular groove 34. If the vehicular speed is further increased, said throttle portion 32 comes leftward passed the wall 33a, as shown in FIG. 3c, to release the communication passage from its throttled state.

Indicated at reference numberals 35 and 36 in FIG. 2 of drawings are an orifice and a one-way valve, respectively, which are disposed in the aforementioned tenth oil line L10 and in parallel with each other. The oil supply to the internal cavaity 16 by switching said control valve 21 to the clutch-applied position is slowly effected by the action of said orifice 35 thereby to reduce and lighten the engaging shock of the clutch 19. On the other hand, the oil drainage from said internal cavity 16 by the return of said control valve 21 to the clutch-released position is promptly effected through said one-way valve 36 thereby to promptly release the clutch 19.

The operation of the clutch control system of the present invention will now be described. As a vehicular speed higher than the predetermined level at which the 3rd speed gear train G3 is established, the oil drainage from the control chamber 20 is conducted by the switching operation of the control valve 21 to the clutch-applied position. In this case, according to the present invention, the oil flows from the internal cavity 16 to the control chamber 20 through the orifice hole 31, which is formed in the clutch plate 19a, so that the internal pressure of the control chamber 20 is varied in accordance with the drainage from said control chamber 20. Thus, the communication passage between the ninth oil line L9 and the oil drain port 23 is throttled by the throttling portion 32 which is formed in said control valve 21. Then, the drop of the internal pressure of said control chamber 20 is regulated to accordingly weaken the engaging force of the clutch 19 so that this engaging force of the clutch 19 can be changed in accordance with the vehicular speed to allow the clutch 19 to operate in a desired slipping state even in such a vehicular speed range that the torque converter pressure is held by the pressure adjusting valve 30 under the lower limit necessary for the fluid torque transmission. Next, when the vehicle speed is further increased so that the throttle portion of valve 21 releases its communication passage from its throttled state, the internal pressure in said control chamber 20 is dropped to the vicinity of the atmospheric level, and the engaging force of the clutch 19 is then determined by the torque converter pressure so that the clutch 19 is switched from the slipping state to the directly coupled state in accordance with the increase in the vehicular speed by controlling the torque converter pressure with the use of the pressure adjusting valve 30.

Thus, according to the present invention, the internal pressure of the control chamber is controlled so that the engaging force of the clutch can be weakened without any drop of the torque converter pressure. As a result, the operating range of the clutch can be set in a wide range independently of the lower limit of the torque converter pressure. The system of the present invention can be constructed merely by providing the clutch plate with the orifice hole and by providing the control valve with the throttle portion. As a result, the present invention can enjoy an effect that its system can be constructed without making a large change in the existing oil circuit.

While the present invention has been described in connection with a specific embodiment, it is to be understood that our invention is not limited thereto but rather is of the full scope of the appended claims.

What is claimed is:

1. A clutch operation control system for a fluid torque converter, having an input side and an output side, of a vehicular transmission in which a clutch is provided for mechanically connecting the input side and output side of said torque converter and said clutch has its clutch plate supplied at its one side with oil pressure in a control chamber for releasing the clutch and at its other side with the torque converter oil pressure in said fluid torque converter, and in which an oil line leading to said control chamber is connected at a vehicular speed equal to or higher than a predetermined level to an oil drain port by means of a control valve responsing to a vehicular speed so that said clutch may be operated with an engaging force determined by said torque converter pressure and by the drainage from said control chamber wherein said clutch plate is formed with an orifice for providing communication between the two sides of said clutch plate; and said control valve is formed with a throttle portion for throttling the communication passage between said oil line and said drain port in a relatively low vehicular speed range equal to or higher than said predetermined level.

2. The control system of claim 1 wherein said control valve comprises a longitudinally shiftable spool in a casing with ports leading to said oil line and said drain port longitudinally spaced therefrom, said throttle portion comprising portions on said spool and casing between said ports that are closely spaced from each other for allowing restricted flow between said ports.

3. The control system of claim 2 wherein said spool has a second portion of reduced diameter adjacent said throttle portion, and said spool being shiftable to a second position with said second portion allowing full communication between said ports to fully engage said clutch.

4. The control system of claim 1 wherein means are provided responsive to the engine throttle opening and said means communicates with said control valve for controlling, together with the vehicle speed, the operative position of said control valve.

5. The control system of claim 1 wherein a second oil line communicates with said torque converter for supplying oil to and releasing oil therefrom, and means in said second oil line for restricting the rate oil supply to said torque converter and allowing unrestricted flow therefrom.

6. A clutch operation control system for a fluid torque converter, having an input side, an output side and a first oil chamber positioned on one side of a clutch of a vehicular transmissions in which the clutch is provided for mechanically connecting the input side and output side of said torque converter with a second oil chamber positioned on the other side of said clutch for operating the clutch in response to the differential pressures in said chambers, the improvement comprising, a control valve means having oil lines connected to the chambers for controlling the oil pressures therein and the rate of change of said oil pressures, said control valve means causing pressures in said chambers at a vehicular speed equal to or higher than a predetermined level to cause engagement of said clutch, and said control valve means including a single throttle valve for throttling the oil flow through the second of said oil lines to allow slippage of said clutch in a relatively low vehicular speed range equal to or higher than said predetermined level.

7. A clutch operation control system for a fluid torque converter, having an input side and an output side, of a vehicular transmission in which a clutch is provided for mechanically connecting the input side and output side of said torque converter, comprising said clutch having a clutch plate with a control chamber on one side for receiving oil pressure for releasing the clutch and the fluid torque converter on the other side for receiving oil pressure to engage said clutch, an oil line leading to said control chamber, a drain line, a control valve having ports connected to said oil line and drain line, said control valve having means responsive to vehicle speed for connecting said oil line and drain line ports at a vehicular speed equal to or higher than a predetermined level so that said clutch may be operated with an engaging force by the oil pressure in said torque converter and by the drainage from said control chamber, said clutch plate having an orifice for providing communication between the two sides of said clutch plate, and said control valve having a throttle portion for throttling the communication passage between said oil line and said drain port in a relatively low vehicular speed range equal to or higher than said predetermined level.

8. The control system of claim 7 wherein a second oil line is connected between said control valve and the fluid torque converter, and means are provided in said second oil line for restricting the rate of oil flow to said torque converter and allowing unrestricted flow from said torque converter, depending on whether said control valve is supplying or receiving oil from the torque converter.

* * * * *